United States Patent [19]

Andresen et al.

[11] Patent Number: 4,518,147

[45] Date of Patent: May 21, 1985

[54] VALVE WITH PRESETTING OF THE AMOUNT OF THROUGHFLOW

[75] Inventors: Erik E. Andresen; Svend P. Pedersen, both of Nordborg, Denmark

[73] Assignee: Danfoss A/S, Nordborg, Denmark

[21] Appl. No.: 567,415

[22] Filed: Dec. 30, 1983

[30] Foreign Application Priority Data

Jan. 11, 1983 [DE] Fed. Rep. of Germany ....... 3300624

[51] Int. Cl.³ .............................................. F15B 13/02
[52] U.S. Cl. .................................. 251/121; 251/126; 137/614.19
[58] Field of Search ................... 137/614.19; 251/121, 251/126, 123, 124, 326; 138/46

[56] References Cited

U.S. PATENT DOCUMENTS

| 3,297,054 | 1/1967 | Nielsen et al. | 137/614.19 |
| 3,472,479 | 10/1969 | Sherwood | 251/121 |
| 3,907,249 | 9/1975 | Persson | 251/126 |

FOREIGN PATENT DOCUMENTS 2748734  5/1979  Fed. Rep. of Germany ...... 251/121

Primary Examiner—Samuel Scott
Assistant Examiner—Helen A. Odar
Attorney, Agent, or Firm—Wayne B. Easton

[57] ABSTRACT

A thermostatic valve assembly having a rotatably adjustable insert for varying the throttle resistance of the valve. The insert has a skirt with a spiral shape to effect a first varying cross section for the valve chamber in which the insert is disposed and the skirt also has an inclined section to effect a second varying cross section for the valve chamber.

6 Claims, 5 Drawing Figures

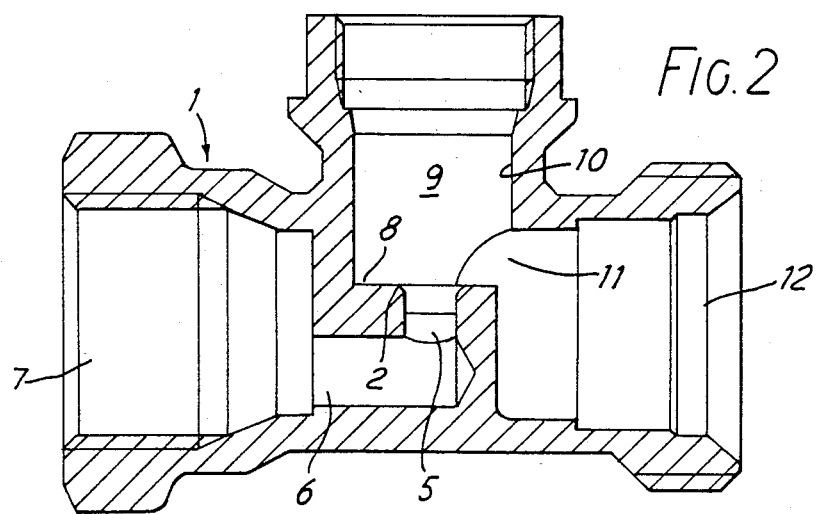
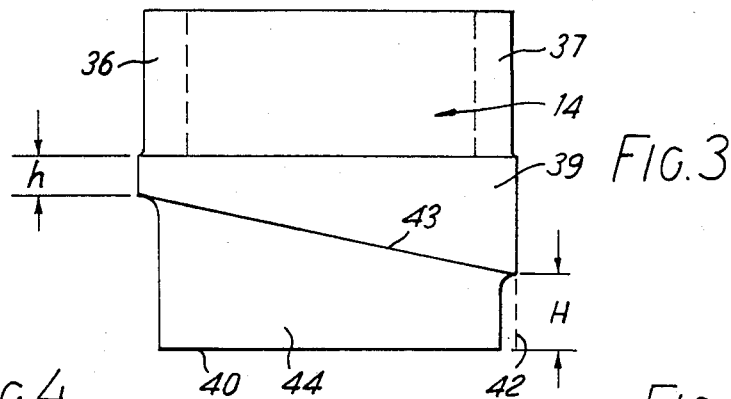
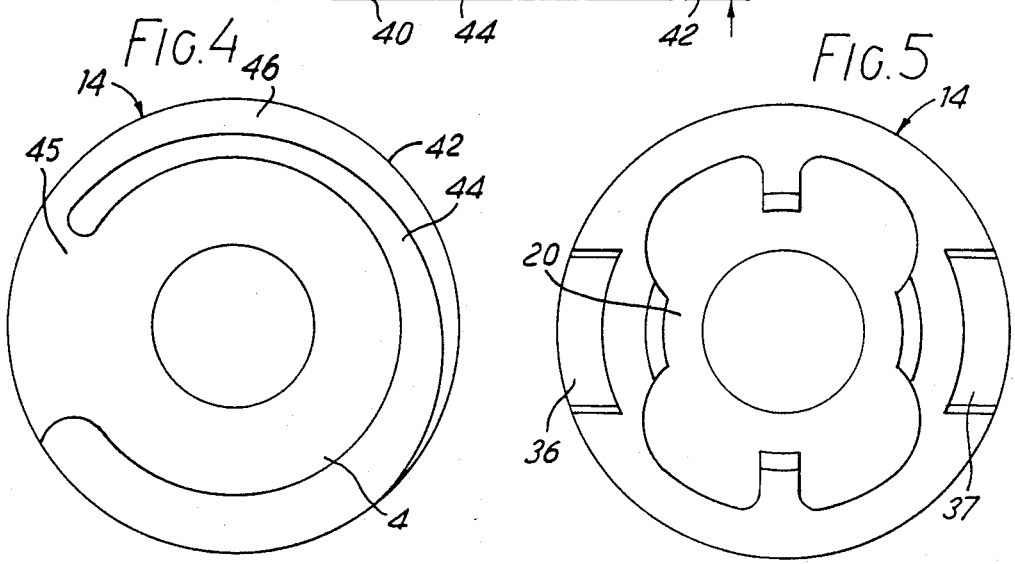

VALVE WITH PRESETTING OF THE AMOUNT OF THROUGHFLOW

The invention relates to a valve with presetting of the amount of throughflow, particularly a thermostatic valve for hot water central heating, comprising a cylindrical housing bore of which the base comprises the valve seat and the cylindrical circumferential surface comprises a fixed opening communicating with a connector, and an insert rotatable by an externally operable setting element and comprising a peripheral wall surrounding a valve chamber which abuts the base of the housing bore with its end under spring force and circumferentially bounds a control orifice which co-operates with the fixed opening and extends from the base of the housing bore through a circumferentially decreasing height.

In a known valve of this kind (DE-PS No. 12 61 722), the insert for forming the control orifice is tapered at the front side over a large proportion of the circumference. In this way, the fixed opening can be covered to a larger or smaller extent to set a desired $k_v$ value. The insert is comparatively long axially because it reaches to near the upper edge of the housing where it is fixed to a gland insert serving as a setting element. The insert is guided not only in the housing bore but also in an adjoining enlargement. In this construction, jamming takes place occasionally and prevents rotary adjustment of the insert.

The invention is based on the problem of providing a valve of the aforementioned kind in which comparatively small forces suffice for the adjustment and the danger of jamming is slight.

This problem is solved according to the invention in that the circumferential wall carries a skirt which reaches to the base of the housing bore and covers the control orifice up to at least one residual throughpassage to the valve chamber, and that the insert is guided only in the housing bore and is connected to the setting element by way of a rotary coupling which permits play.

In this construction, the skirt enables the insert to be supported not only at one side at the base of the housing bore but also substantially all around. Consequently, it cannot be tilted by the spring acting thereon. Instead, it will always retain an accurate axial alignment. By separating the insert and setting element, one prevents the exertion, for example by an adjusting tool, of transverse forces on the insert that might lead to tilting. There is therefore also no need to guide the insert over an extensive length. A comparatively short guide solely within the housing bore will suffice. By reducing the area of the guide faces, one also reduces the frictional forces so that the adjusting forces as a whole can be reduced. Since the setting element can be mounted comparatively loosely, its bearing friction is practically unimportant. Since the insert is not subjected to transverse forces, one can also select a much closer fit than hitherto. This, in turn, enables one to use shorter sealing distances so that the insert as a whole can be kept small.

It is particularly favourable if only one throughpassage is provided and is disposed at one end of the control orifice. Since in this case the skirt is closed over most of its length, a completely closed passage is formed between the fixed opening and the throughpassage and can bring about all or some of the desired throttling.

It is favourable for the throughpassage to be disposed at that end where the control orifice has its largest height. As a result, when the effective section of the passage becomes longer, the part of the fixed opening left free by the control orifice also becomes smaller. The throttling effects at the co-operating apertures and in the passage therefore change in the same sense.

Preferably, the guide face of the insert already terminates just above the control orifice. The narrowest portion of the guide face, which is located in the region of the largest height of the control orifice, need merely have a height corresponding to the required sealing distance. Since a good fit is possible, a height of less than 5 mm or even less than 2 mm will be sufficient for the usual pressures.

Further, the insert can be of a different material from that of the setting element. In this way, one can take account of the special conditions of the insert (good sealing, low friction, high resistance to flow) independently of the properties required for the setting element (mechanical strength, wear resistance to the setting tool).

In particular, the insert may be of plastics material. Amongst the many plastics that are usable, polyphenylene sulphide with a glass fibre reinforcement is particularly recommended.

Other advantages are obtained if the insert is an extruded, cast or injected moulding. The insert can then be produced without any machining, the control orifice extending over part of the circumference then being in the form of a groove extending from the end. In this way, one can produce configurations for the groove that are in no way possible with the aid of a machine tool. In many cases, this facilitates an extremely accurate adaptation to the particular throttling requirements.

In a further embodiment of the invention, the skirt has a constant internal diameter but becomes thicker with increasing height of the control orifice. The cross-section of the throttling passage is therefore not only influenced by a change in height but also by a change in width so that the throttling effect can be influenced even more strongly.

It is favourable for the height of the control orifice to be selected so that the $k_v$ value changes linearly upon rotation of the insert. In this way, the $k_v$ value can be very accurately set to the desired intermediate value with the aid of a scale on the housing. To achieve this, it may be necessary to compose the height of the control orifice of sections of different mathematical functions.

A particularly simple kind of rotary coupling permitting play is obtained if the insert comprises axial grooves in which the axially extending fingers of the setting element engage with play. In this way, it is even possible to keep the external diameter of the setting element smaller than the diameter of the guide face of the insert, so that the coupling and insert can be accommodated in the same housing bore.

A preferred example of the invention will now be described in more detail with reference to the drawing, wherein:

FIG. 2 is a longitudinal section through the valve housing at a scale smaller than that of FIG. 1;

FIG. 3 is a side elevation of the FIG. 1 insert;

FIG. 4 is an underplan of the FIG. 1 insert, and

FIG. 5 is a plan view of the FIG. 1 insert.

Figure 1:
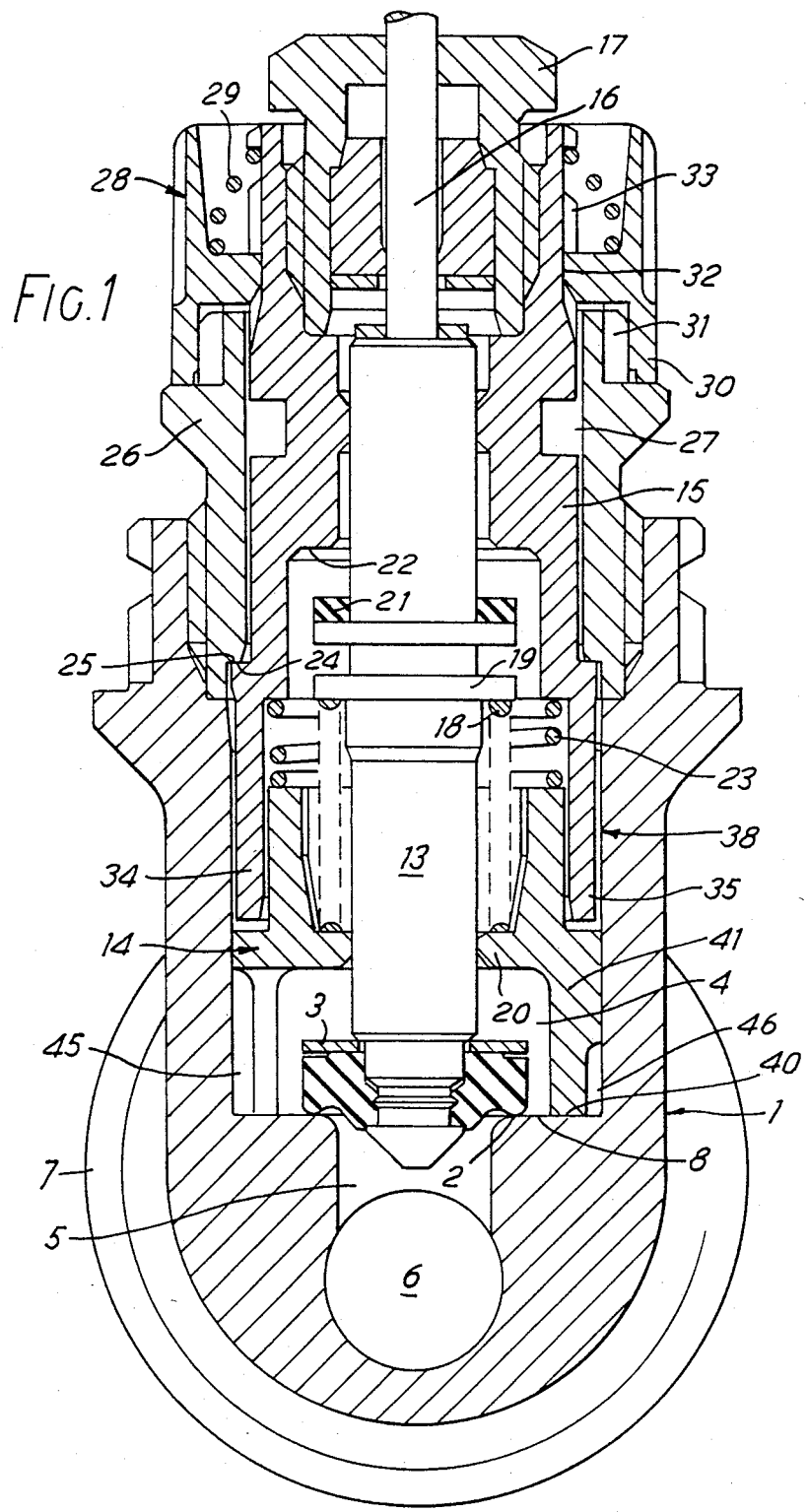
FIG. 1 is a cross-section through a valve according to the invention.

A valve housing 1 comprises a valve seat 2 and a co-operating closing member 3. In the closed condition, this blocks a first valve chamber 4 from a second valve chamber 5 which is connected to a connector 7 by a passage 6. The valve seat 2 is disposed at the base 8 of a housing bore 9 of which the circumferential surface 10 is provided with a fixed opening 11. This communicates with a second connector 12.

The closing member 3 is carried by a valve shank 13 which passes through an insert 14 in the housing bore 9 and a setting element 15. A pin 16 engaging the upper end of the valve shank 13 is adjustable by a thermostat attachment (not shown) and passes through a gland 17 screwed into the setting element 15. A return spring 18 engages a collar 19 of the valve shank 13 and is supported at an inner annular flange 20 of the insert 14. The valve shank 13 also carries a return seal 21 which co-operates with a step 22 on the setting element 15.

The axial position of the setting element 15 is determined by the fact that a spring 23 supported at the insert 14 presses a step 24 of the setting element against a step 25 of a depressor 26 screwed into the housing 1. The setting element 15 is sealed from this depressor by means of a sealing ring 27. With the aid of a setting ring 28, the setting element 15 can be turned when the ring is moved axially outwardly against the force of the spring 29. In this case, multiple teeth 30 on the setting ring 28 disengage complementary formations 31 at the depressor 26 whilst different multiple teeth 32 on the setting ring 28 remain engaged with complementary formations 33 on the setting element 15 so that rotary adjustment is possible.

The setting element 15 comprises two axial fingers 34 and 35 which engage in corresponding axial grooves 36 and 37 of the insert 14 with such play that both parts can turn relatively to each other to a small extent. In this way, one obtains a rotary coupling with which a torque can be transmitted only from the setting element 15 onto the insert 14 without giving rise to a transverse force that might cause jamming.

The insert 14 comprises a cylindrical guide surface 39 which sealingly co-operates with the circumferential surface 10 of the housing bore 9. The smallest height h of this guide surface is selected so that it suffices as a seal with due regard to the fit. A second sealing surface is formed by the end 40 of the insert 14 which is pressed by the spring 23 against the base 8 of bore 9. Since no transverse or tilting forces can be exerted from the outside, the surfaces 39 and 40 lie against the corresponding backing surfaces so well that short sealing distance will suffice.

The insert 14 comprises a circumferential wall 41 which surrounds the valve chamber 4 and the external circumferential surface of which is partially bounded by the guide surface 39. Beneath this guide surface there is a control orifice 42 which extends between a set-back portion 43 at the underside of the guide surface 39 and the base 8 of the housing bore 9. The height H of the control orifice 42 increases in one sense in the circumferential direction. Between the control orifice 42 and the valve chamber 4, a skirt 44 provided over the greater part of the circumference likewise reaches to the base 8. The thickness of the skirt 44 increases towards the smaller height H of the control orifice 42, as will be evident from FIG. 4. At the region of the largest height H, there is a throughpassage 45.

After introducing the insert 14 in the housing bore, a passage 46 formed between its circumferential wall 10, its base 8, the set-back portion 43 and the skirt 44 forms a passage 46 which leads from the fixed opening 11 in the housing 1 to the throughpassage 45. This produces a throttling effect which depends on the transitional cross-section between the fixed opening 11 and the control orifice 42, the effective length of passage 46, and the cross-section of the passage determined by the height and breadth.

If the insert 14 is turned by the setting element 15, all the parameters change in the sense of a like change in the throttling effect. For example, if a zone of smaller height H of the control orifice 42 is brought into registry with the fixed opening 11, the passage 46 is simultaneously extended and a section of smaller cross-section is made operative. By appropriately selecting the course of the height H, it is possible to change the $k_v$ values determining the amount of throughflow over such a large range that equal differences in the angle lead to equal differences in the $k_v$ value.

As is evident from FIG. 2, the fixed opening 11 can also extend into the base 8 of the housing bore 9 so that the passage 46 can also be filled from the end. This is sometimes desired when, with the shallowest possible structural height of the housing, the fixed opening is to have as large a cross-section as possible.

In the present example, the throttling insert 14 is of plastics material whereas the housing 1, setting element 15, gland 17, depressor 26 and adjusting ring 28 are of brass.

The diameter of the insert 1 and of the housing bore 9 is only 14.5 mm and the height of the insert only 13.5 mm.

If the throttling effect is brought about primarily by the overlapping cross-section between the free opening 11 and the control orifice 42, the skirt 44 may, instead of the single throughpassage 45 at one end, comprise a plurality of throughpassages distributed over its length.

Although the valve is primarily intended for application to thermostatic valves of hot water central heating installations, so that presetting of the desired $k_v$ value permits uniform distribution of the heat carrier in the installation, the presetting is also suitable for other valves, for example for manually operated radiator valves or water valves.

We claim:

1. A thermostatic valve assembly, comprising, a housing having inlet and outlet connections and a valve controlled opening having a valve seat therebetween, said housing defining a cylindrically shaped valve chamber on one side of and coaxially aligned with said opening, said valve chamber having a cylindrically shaped wall with an ingress aperture providing fluid communication between said inlet connection and said valve chamber, said housing forming a base section for said valve chamber in surrounding relation to said valve seat, a valve closure member in said valve chamber cooperable with said valve seat, an adjustable throttle member rotatably mounted in said valve chamber in surrounding relation to said valve closure member, said throttle member having a spiral wall extending spirally relative to the axis of said valve seat which forms a variable throttle passage with said valve chamber cylindrically shaped wall and which enlarges and contracts relative to said ingress aperture when said throttle member is selectively rotated in opposite directions to form an adjustable cross section throttle passage, said spiral wall having an axial end thereof in sliding and sealing engagement with said base section in surrounding relation to said valve seat, said spiral wall being circumferentially discontinous to form a circumferential opening which forms a through passage providing fluid communication between said throttle passage and said valve controlled opening, and setting means for rotating said throttle member to provide varying desired throttling conditions between said ingress aperture and said valve controlled opening.

2. A thermostatic valve assembly according to claim 1 including a shank member connected to said closure member and extending through said valve chamber.

3. A thermostatic valve assembly according to claim 1 wherein said spiral wall is circumferentially inclined relative to said sealing section to provide a second varying cross sectin for said throttle passage.

4. A thermostatic valve assembly according to claim 3 wherein said through passage is adjacent the highest end of said spiral wall.

5. A thermostatic valve assembly according to claim 1 wherein said sealing section coooperates with said valve chamber circumferential wall to form guide means for said throttle member to provide for guided rotatable movement thereof.

6. A thermostatic valve assembly according to claim 1 including a setting member for adjustably rotating said throttle member, said throttle member having axially extending grooves, and said setting member having axially extending fingers disposed in said grooves, said fingers having slightly smaller circumferential widths than said grooves to allow circumferential play between said setting member and said throttle member.

* * * * *